United States Patent Office 3,806,543
Patented Apr. 23, 1974

3,806,543
METHOD FOR ALKALI-CLEAVAGE OF N-TERT-ALKYLAMIDES
Toshiro Takata, Takehiro Yamada, and Hideaki Fukuizumi, Shizuoka, Japan, assignors to Toho Beslon Kabushiki Kaisha, Tokyo, Japan
No Drawing. Filed Dec. 29, 1971, Ser. No. 213,747
Claims priority, application Japan, Dec. 30, 1970, 46/122,335; Sept. 18, 1971, 46/72,751, 46/72,752
Int. Cl. C07c 57/04
U.S. Cl. 260—526 N      5 Claims

ABSTRACT OF THE DISCLOSURE

This invention lies in the cleavage of N-tert-alkylamides of the formula $R_1$—CONH—$R_2$ ($R_1$ is a saturated or unsaturated hydrocarbon group having 2 or 3 carbon atoms or the methoxy-derivative of such hydrocarbon group, and $R_2$ is a tert-alkyl group) with an alkali reagent to form a tert-alkylamine and a carboxylic acid. It is accelerated by methanol to obtain the corresponding tert-alkylamine and carboxylic acid in a very high yield.

---

This invention relates to the method of alkali-cleavage of a compound of the formula, $R_1$—CONH—$R_2$ in which $R_1$ means a saturated or unsaturated hydrocarbon group having 2 or 3 carbon atoms or the methoxy-derivative of such hydrocarbon group, and $R_2$ represents a tert-alkyl group, and more particularly to a method for cleaving any of the N-tert-alkylamides as represented by said formula in the presence of an alkali and methanol to form a tert-alkylamine and a carboxylic acid or a derivative thereof.

Among the compounds of said formula, there are N-tert-butylacrylamide, N-tert-butylmethoxypropionamide, N-tert-amylacrylamide, N-tert-amylpropionamide, N-tert-amylmethoxypropionamide, N-tert-octylacrylamide, N-tert-octylmethacrylamide, N-tert-dodecylacrylamide and the like.

The term alkali-cleavage means splitting the amides —CONH— bond with the alkali reagent to form a carboxylate and an amine.

It is known that N-tert-butylformamide or N-tert-butylacetamide is treated with an alkali reagent to produce tert-butylamine and formic or acetic acid. In fact one of the resulting products, tert-butylamine is valuable as an industrial material, but both of the resulting carboxylic acids are not so valuable. The inventors have tried to obtained more valuable carboxylic acid derivatives and the desired alkylamine by submitting various N-tert-alkylamides of said formula which is designated N-TAD in the following description, to alkali-cleavage. When N-TAD having three or more carbon atoms is submitted to alkali-cleavage by the conventional method which has been applied to amides having two or less carbon atoms, the yield of the resulting tert-alkylamine is too poor to be applied practically.

It is also known that the formamide derivatives of the formula,

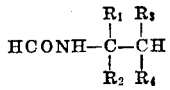

in which every R means a hydrogen or alkyl group is submitted to hydrolysis to form the corresponding alkylamine and formic acid. It was difficult, however, to apply this method to carboxylic amides having three or more carbon atoms such as propionamide, acrylamide and the like. Due to the larger atomic group at the carboxylic acid side which causes steric hindrance, the accessibility of the alkali reagents to the amide bond becomes difficult, and due to the low solubility of the amide compound itself in water, the reaction can not be carried out in a homogeneous system. (For example, the solubility of N-tert-butylacrylamide, is only 0.7 gr. in 100 gr. water at 25° C.) When a carboxylic amide having three or more carbon atoms is submitted to hydrolysis, the reaction proceeds very slowly under alkaline conditions, but under acidic conditions, for instance in aqueous sulfuric acid solution, the reaction rate is high, though the resulting tert-butylamine is further decomposed to ammonia and isobutylene as shown in the following;

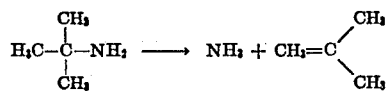

(see J. Am. Chem. Soc. vol. 70, p. 4045 (1948))

Thus it can be said that no desirable method for preparing such alkylamines from carboxylic alkylamides except formic amides has been known.

The inventors have found that when N-TAD is submitted to alkali-cleavage in the presence of methanol and at a temperature above 140° C., it can be effectively cleaved to the corresponding amine and carboxylic derivative in very high yield. The temperature ranges more preferably from 150° to 250° C. The alkali may be caustic soda and/or caustic potash. Water may be added to this reaction system for dissolving the alkali reagent in the methanolic medium easily. It is carried out generally in an inert atmosphere such as nitrogen.

When such N-TAD is submitted to alkali-cleavage in this invention, not only can the corresponding alkyl amines be obtained in a pure state in very high yields but also the valuable carboxylic acid derivatives can be obtained which are utilized as free carboxylic acid after acidification with mineral acid or in the case of unsaturated carboxylic derivatives it can be esterified to the esterified monomer for preparing a high polymer.

Ethanol, propanol and other alcohols also can be used instead of methanol, but it is noted that methanol is far more effective in order to obtain the desired results as referred to above. Methanol can dissolve the N-TAD to form a homogeneous system and accelerate or promote the cleavage or splitting of the amide-bond by cooperation with the alkali. Namely methanol not only physically dissolves the material N-TAD in the homogeneous reaction system to carry out the cleavage reaction smoothly but also chemically promotes splitting of the amide-bond with the alkali. It can be justified by the fact that dioxane, isopropanol and the like may dissolve a N-TAD but hardly affect the cleavage of the amide-bond by the alkali. The primary alcohols other than methanol, such as ethanol, propanol, ethylene glycol are less effective than methanol in this reaction, which is seen in the following table. Then it suggests that the presence of the —OH group of the alcohol may contribute to this reaction, and the position of —OH in the alcohol (primary or secondary) used and the bulkiness of the alcohol molecules influence the reaction to a great extent.

The results of alkali-cleavage of N-tert-butylacrylamide by NaOH in various alcohols at 160° C. are shown in the following table.

TABLE I

| Alcohol | Yield of N-tert-butylamine (percent) after— | |
|---|---|---|
| | 2 hr. | 4 hr. |
| Methanol | 40.5 | 58.0 |
| Ethanol | 23.0 | 45.0 |
| Propanol | 12.0 | 17.5 |
| Ethyleneglycol | 18.0 | 25.0 |
| Dioxane | No reaction | |
| Isopropanol | No reaction | |

It can be seen from said table that the more the number of carbon atoms in the primary alcohol is increased the less the yield of the corresponding amine is and that methanol is more preferable than the other alcohols. This tendency can be applied to the other N-TAD's, too.

Methanol is used in this invention preferably in the amount of 2 to 10 parts and more preferably about 5 parts by weight relative to 1 part of N-TAD. The temperature is important as described above. Below 140° C. the decomposition can hardly take place, but above 250° C. further decomposition of the carboxylic acid occurs. Thus it preferably ranges from 150° to 250° C.

The influence of the amount of methanol used and the temperature on the yield of the resulting alkylamine is shown in the following tables.

TABLE II

| Methanol(wt.)/N-tert-butyl acrylamide(wt.) | Temperature (° C.) | Yield of tert-butyl-amine, percent |
| --- | --- | --- |
| 5 | 140 | Trace |
| 5 | 150 | 18 |
| 5 | 170 | 62 |
| 5 | 200 | 79 |
| 5 | 230 | 88 |
| 2 | 200 | 63 |
| 1.5 | 200 | 59 |
| 0 | 200 | 18 |
| 0 | 170 | 16 |
| 0 | 150 | Trace |

(The reactions were carried out under the conditions described in Example 1.)

TABLE III

| Methanol(wt.)/N-tert-butylmethoxy propiona-mide(wt.) | Temperature (° C.) | Yield of tert-butyl-amine, percent |
| --- | --- | --- |
| 5 | 150 | 37 |
| 5 | 170 | 65 |
| 5 | 200 | 83 |
| 5 | 230 | 85 |
| 2.5 | 200 | 70 |
| 1.0 | 200 | 62 |
| 0 | 200 | 47 |
| 0 | 170 | 30 |
| 0 | 150 | 12 |

(The reactions were carried out under the conditions described in Example 5.)

The cleavage of N-TAD is completed in about 8 hours although it is varied depending on the temperature. Then the reaction mixture is submitted to distillation to separate the alkylamine with methanol or methanol-water from the reaction mixture. The residue is acidified with mineral acid to free the alkyl-carboxylic acid, or if necessary it is treated with alcohol to obtain the carboxylic acid alkyl ester.

This invention is very valuable from an economic view point in the fact that the desired alkyl amine can be obtained in very high yield by simple steps and that the carboxylic acid or its derivatives obtained are also industrially valuable.

This invention is explained in more detail in the following examples, but it is noted that these examples are given not for limiting the invention.

EXAMPLE 1

Into a sealed reaction vessel with a stirrer were added 96 parts N-tert-butylacrylamide, 480 parts methanol, 40 parts caustic soda, 60 parts water. And 3 parts hydroquinone monomethylether was added to this mixture as inhibitor of vinyl-polymerization. After purging with nitrogen, the reaction mixture was stirred at 230° C. for 2 hours.

Then the reaction mixture was submitted to distillation at atmospheric pressure to obtain methanol/water/tert-butylamine, which contained 46.5 parts of the amine, and the yield was 84%. The melting point of tert-butyl-amine picrate was 197.5°–198.5° C.

EXAMPLE 2

Into a similar vessel were added 96 parts N-tert-butyl-acrylamide, 480 parts methanol, 40 parts caustic soda, 60 parts water and 3 parts hydroquinone monomethyl-ether.

Then the reaction mixture was stirred at 200° C. for 5 hours under nitrogen atmosphere.

After distillation of the reaction mixture as in Example 1, 43.5 parts tert-butylamine were obtained (79% yield). The distillation residue was acidified with sulfuric acid and the free carboxylic acid extracted with ether. The ether solution was dried over anhydrous sodium sulfate. After removal of the ether, 5 parts methanol and 5 parts sulfuric acid were added, and refluxed for 3 hours in a reaction vessel provided with a reflux condenser. When distilled, 45.5 parts methyl acrylate were obtained, the yield 70.5%.

EXAMPLE 3

Into a sealed reaction vessel with a stirrer were added 64 parts N-tert-butylacrylamide, 256 parts methanol, 20 parts caustic soda, and 1.5 parts hydroquinone mono-methylether. After purging with nitrogen, the reaction mixture was stirred at 230° C. for 3 hours, and distilled; 27.5 parts tert-butylamine were obtained, the yield 75%.

EXAMPLE 4

Into a sealed reaction vessel with a stirrer were added 96 parts N-tert-butylacrylamide, 480 parts methanol, 56 parts caustic soda, 60 parts water and 3 parts hydroqui-none monomethylether. After purging with nitrogen, the reaction mixture was stirred at 200° C. for 5 hours, and distilled; 44.5 parts tert-butylamine were obtained, the yield 80.5%.

EXAMPLE 5

Into a sealed reaction vessel with a stirrer were added 120 parts N-tert-butylmethoxypropyionamide, 600 parts methanol, 40 parts caustic soda and 60 parts water. After purging with nitrogen, the reaction mixture was stirred at 200° C. for 5 hours, and distilled; a solution of methanol/water/tert-butylamine was obtained, which contained 46.5 parts tert-butylamine, the yield 83%.

The melting point of the tert-butylamine picrate was 197.5°–198.5° C.

The distillation residue was acidified with sulfuric acid and extracted with ether to obtain 51 parts methoxypropionic acid, the yield 65%.

EXAMPLE 6

Into a reaction vessel with a reflux condenser and a thermometer, were added 26 parts methoxypropionic acid as obtained in Example 5, 2.6 parts of 96% sulfuric acid and 0.75 part hydroquinone monomethylether; and submitted to reflux for 3 hours.

The reflux was started at about 150° C. at the initial stage but the reflux temperature was gradually lowered to 117–118° C. after 3 hours.

The reaction mixture was distilled by the usual method to obtain 19 parts methylacrylate, the yield 88%.

EXAMPLE 7

Into the vessel described in Example 1 were added 120 parts N-tert-butylmethoxypropionamide, 480 parts methanol, 56 parts caustic potash and 60 parts water. After purging with nitrogen, the reaction mixture was stirred at 200° C. for 5 hours, and distilled to obtain 47.5 parts tert-butylamine, the yield 86%.

EXAMPLE 8

Into the vessel described in Example 1, were added 120 parts N-tert-butylmethoxypropionamide, 600 parts methanol, and 40 parts caustic soda, and the reaction mixture was stirred in an atmosphere of nitrogen at 230° C. for 3 hours, and distilled to obtain 43 parts tert-butylamine, the yield 78%.

EXAMPLE 9

32 parts N-tert-butylacrylamide, 12 parts caustic soda, 20 parts water, 160 parts methanol and 1 part hydroquinone monomethylether were treated in a nitrogen atmosphere in a sealed vessel under stirring at 170° C. for 15 hours, and distilled, 11.0 parts tert-butylamine (B.P. 45° to 46° C.) were obtained, the yield 60%.

After removal of methanol and water by distillation, the reaction mixture was acidified with sulfuric acid, and extracted with ether repeatedly, 10.0 parts acrylic acid were obtained from the ether solution, the yield 55%, B.P. 141°–143° C.

EXAMPLE 10

Into a sealed reaction vessel with a stirrer were added 120 parts N-tert-butylmethoxypropionamide, 480 parts methanol, 40 parts caustic soda and 60 parts water. After purging with nitrogen, the reaction mixture was stirred at 200° C. for 5 hours, and distilled, 46 parts tert-butylamine were obtained, the yield 83%.

The distillation residue was acidified with sulfuric acid, and repeatedly extracted with ether. Then 51 parts methoxypropionic acid were obtained from the ether solution, the yield 65%.

What is claimed is:

1. Method for alkali-cleavage of an N-tert-alkylamide having the formula, $R_1$—CONH—$R_2$ in which $R_1$ is a saturated or unsaturated hydrocarbon group having 2 or 3 carbon atoms or the methoxy-derivative of such hydrocarbon group, and $R_2$ is a tert-alkyl group in an inert gas atmosphere in the presence of methanol and above 140° C. to produce the corresponding carboxylic acid and tert-alkyl amine.

2. Method as claimed in claim 1, in which the alkali is selected from the group consisting of caustic soda and caustic potash.

3. Method as claimed in claim 1, in which the alkali-cleavage reaction is carried out at 150° to 250° C.

4. Method as claimed in claim 1, in which methanol is used in the amount of 2 to 10 parts to 1 part of said N-tert-alkylamide.

5. Method as claimed in claim 4 in which methanol is used in the amount of 5 parts to 1 part of said N-tert-alkylamide.

References Cited

Degening: Organic Nitrogen Cmpds., 1950, pp. 496.

LORRAINE A. WEINBERGER, Primary Examiner

P. J. KILLOS, Assistant Examiner

U.S. Cl. X.R.

260—486 R, 486 D, 535 R, 540, 583 R